United States Patent [19]

Creech

[11] 4,206,668

[45] Jun. 10, 1980

[54] CUTTING AND SIZING DEVICE FOR FOAMED MATERIAL

[76] Inventor: Cecil K. Creech, P.O. Box 12, Shadyside, Md. 20867

[21] Appl. No.: 932,191

[22] Filed: Aug. 9, 1978

[51] Int. Cl.$^2$ .......................... B26D 7/10; B29C 17/10

[52] U.S. Cl. ...................................... 83/171; 83/581.1; 83/610; 83/613; 83/651.1; 83/662

[58] Field of Search ...................... 83/171, 651.1, 662, 83/610–612, 581.1, 633, 627, 616, 613

[56] References Cited

U.S. PATENT DOCUMENTS

| | | | |
|---|---|---|---|
| 943,541 | 12/1909 | Hasselback | 83/651.1 |
| 2,135,113 | 11/1938 | Rehbein | 83/610 X |
| 2,987,598 | 6/1961 | Chace | 83/171 |
| 3,540,336 | 11/1970 | Kelsey | 83/171 |

FOREIGN PATENT DOCUMENTS

| | | | |
|---|---|---|---|
| 577602 | 6/1958 | Italy | 83/171 |

*Primary Examiner*—J. M. Meister
*Attorney, Agent, or Firm*—John P. Snyder

[57] ABSTRACT

Apparatus for cutting a block of foamed material to the size of a laminate adhered thereto includes a support table and a carrier frame pivotally attached to the table. The carrier frame carries an electrical resistance wire and maintains same constantly under tension. The frame is vertically swingable to pass the wire through the foamed material along a clearly delineated line with respect to which the block is precisely located. This line is in registry with a transverse groove in the table which divides its supporting surface into sections on either side thereof and at right angles to an upstanding guide member extending along one side edge of the table.

9 Claims, 6 Drawing Figures

CUTTING AND SIZING DEVICE FOR FOAMED MATERIAL

BACKGROUND OF THE INVENTION

This invention relates to the mounting of graphic arts and similar articles of sheet-like form for display on one surface of a block of foamed plastic material. Graphic arts and the like are frequently required to be mounted on some rigidifying support mechanism for display purposes and it is most conventional to mount same in a suitable frame as is ordinarily done with works of art such as paintings and the like. However, the construction and framing as conventionally employed is relatively expensive and it often the case that such conventional framing represents too expensive an approach to be practical.

The graphic art work can of course simply be adhesively secured to the supporting surface of any rigidifying substrate such as poster board, plywood and the like in order to provide a firm support for the art work while holding it in some semblance of rigid form or shape as opposed to the mere mounting of such work on a wall surface. However, such a technique still leaves the surface of the work exposed to ambient conditions and does not save same from the wear and tear of ordinary conditions.

BRIEF SUMMARY OF THE INVENTION

It is therefore of primary concern in connection with the present invention to provide an improved manner of mounting of graphic works of art and the like in fully protected form but by techniques which are inherently inexpensive as compared with conventional mounting techniques such as framing.

Basically, the technique involves first adhesively mounting the work on a suitable substrate which is in the form of poster board. This two-ply laminate is then further laminated between two layers or plies of Mylar under sufficient heat and pressure to bond one layer of the Mylar film to the backside of the poster board and the other Mylar film to the face of the graphic work of art or the like. This laminate is then trimmed to the precise size desired for the final product and it is then adhesively bonded to a block of foamed plastic material such as Styrofoam and the resultant foam-mounted laminate is then trimmed to remove the excess foamed material and size the foamed material block precisely to the dimensions of the laminate which is adhered thereto.

This final cutting or sizing of the foam material is effected with the apparatus of this invention which essentially comprises a support table and a carrier frame pivotally secured thereto, the carrier frame including arms between the free ends of which is mounted an electrical resistance wire which, when energized, is heated to an operating temperature sufficient to melt through the foamed material and thereby provide a clean, straight and esthetically pleasing edge surface which is precisely aligned with an edge of the laminate adhered thereto. The carrier frame features means for maintaining the wire constantly under tension so it will not sag when heated to its operating temperature and the table is provided with a transverse groove which allows the block with the laminate thereon to be precisely positioned to allow the wire to cut exactly along an edge of the laminate. The table also includes an upstanding guide member along one side edge thereof which allows the cut made by the wire to be perpendicular to each other and thus provide a true rectangular form for the block in precise dimensional size with respect to the laminate adhered thereto.

BRIEF DESCRIPTION OF THE DRAWING FIGURES

DETAILED DESCRIPTION OF THE INVENTION

Figure 1:
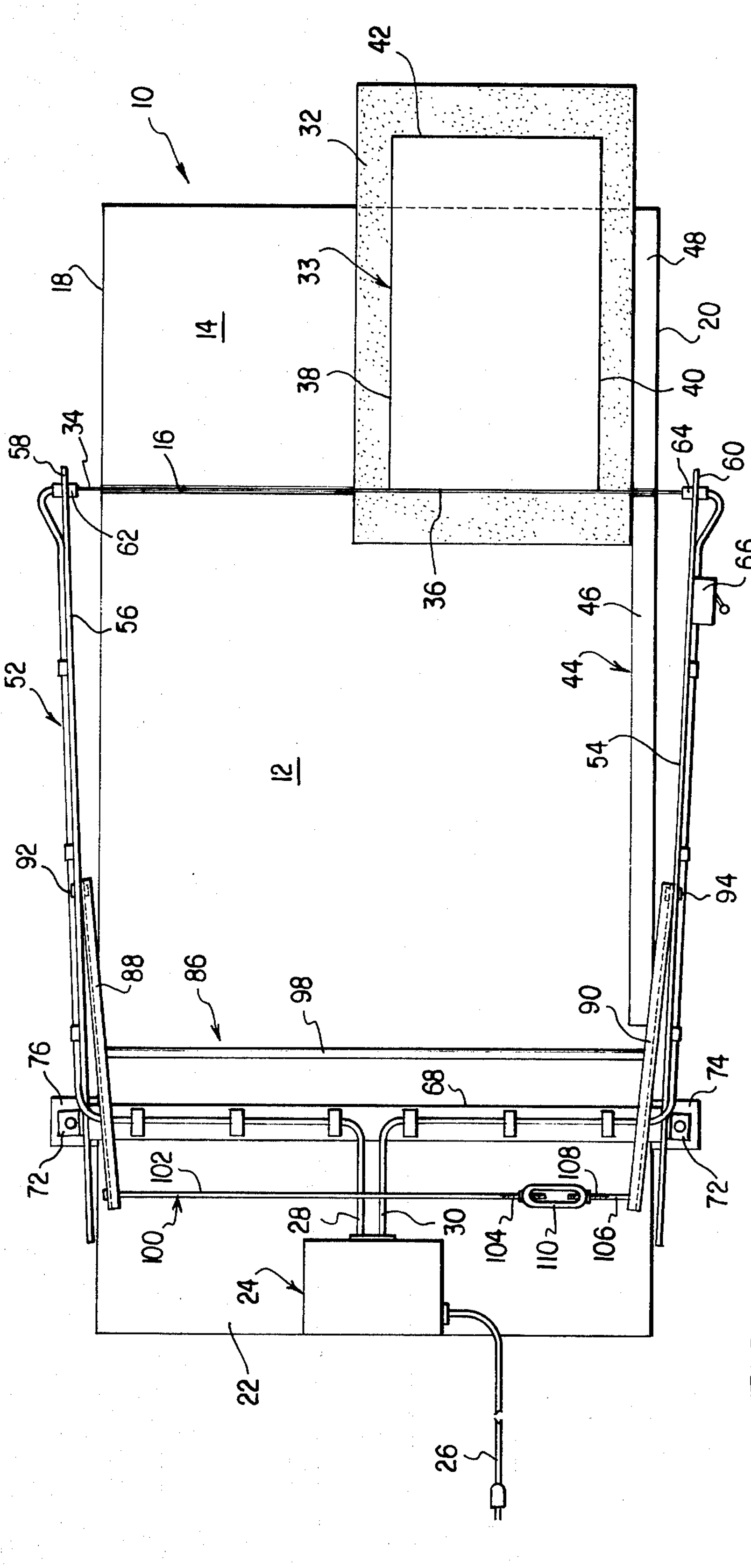
FIG. 1 is a plan view of the apparatus and illustrating a cut being made through a foamed block.
Figure 2:
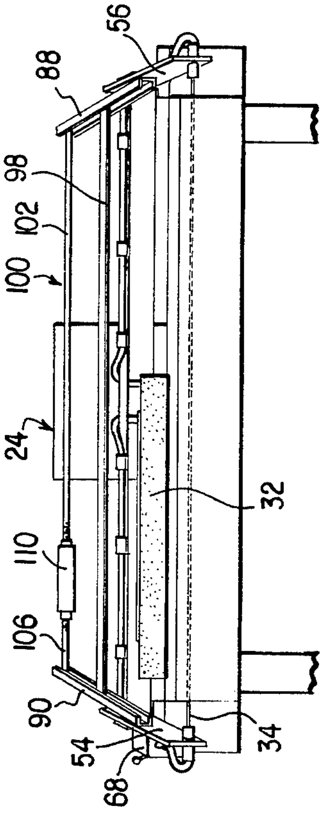
FIG. 2 is an end view of the assembly shown in FIG. 1.

Referring more particularly to FIG. 1, the apparatus according to this invention will be seen to include a supporting table indicated generally by the reference character 10 which provides a horizontal supporting surface divided into the two sections indicated by the reference characters 12 and 14 by the transverse groove 16 extending between the opposite side edges 18 and 20 of the table.

The end 22 of the table opposite the section 14 mounts a power supply device indicated generally by the reference character 24 which is provided a lead 26 for connection to conventional line voltage and which produces a low voltage output at the lines 28 and 30 for purposes which will be presently apparent.

As is also shown in FIG. 1, an oversize block 32 of foamed, synthetic resinous material, for example Styrofoam, is in the process of being severed by the electrical resistance wire 34 which completes the circuits between the low voltage lines 28 and 30 and thus has become heated to a temperature sufficient to melt through the foamed material 32 along a line in registry with the aforementioned groove or channel 16. The process as has been described above involves the mounting of a poster or other graphic art work on a backing of poster board to lend rigidity and support thereto, this lamination being effected by means of a suitable adhesive. Thereafter, the work of art as bonded to the poster board is laminated on both sides with Mylar film or other suitable thermoplastic and heat-bondable material so that the poster board and the work of art adhered thereto is laminated between the transparent layers of the bondable material. This laminate is effected by conventional means under heat and pressure and provides a fully protected work which is then trimmed to the final desired size to provide the laminate indicated generally by the reference character 33 in FIG. 1. This laminate is then adhesively bonded to one face of the oversize foam block 32 after the laminate has been trimmed to the desired final size.

Then, the entire assembly is placed on the supporting table as illustrated in FIG. 1 and a first cut is made, as shown, by aligning the edge 36 of the laminate 34 along the channel or groove 16 and thereafter passing the hot wire 34 therethrough. It is to be understood that the sequence of cutting along the edges of the finished laminate 34 need not be as is precisely indicated in FIG. 1. For example, either one of the side edges 38 or 40 may be aligned with the groove 16 and the appropriate cut through the oversize foam block 32 made along this edge whereafter as an aid in aligning the next edge as for example the end edge 36 or the end edge 42 may be effected by abutting the already severed edge against the guide member indicated generally by the reference character 44.

As can be seen best in FIGS. 3 and 4, the guide member is divided into two sections 46 and 48 defining a gap or channel 50 therebetween which is in registry with one end of the channel or groove 16 and thus, together with such channel, allows the wire 34 to pass completely through the foamed material 32 to a point slightly below the supporting surfaces 12 and 14. The guides sections 46 and 48 are disposed in upstanding relationship along one side of the table 10 as is illustrated in FIG. 6.

The carrier frame which is indicated generally by the reference character 52 supports the wire 34 and will be seen to consist essentially of the two metal arms 54 and 56 whose free ends 58 and 60 carry insulating members 62 and 64 respectively which anchor the opposite ends of the wire 34 therein. The two lines 28 and 30 are seen to extend to the respective opposite ends of the wire 34 and in series circuit with the line 30 there is provided a manually actuable switch 66 by means of which the operator may control the energization of the wire 34.

Figures 3, 4, 5, 6:
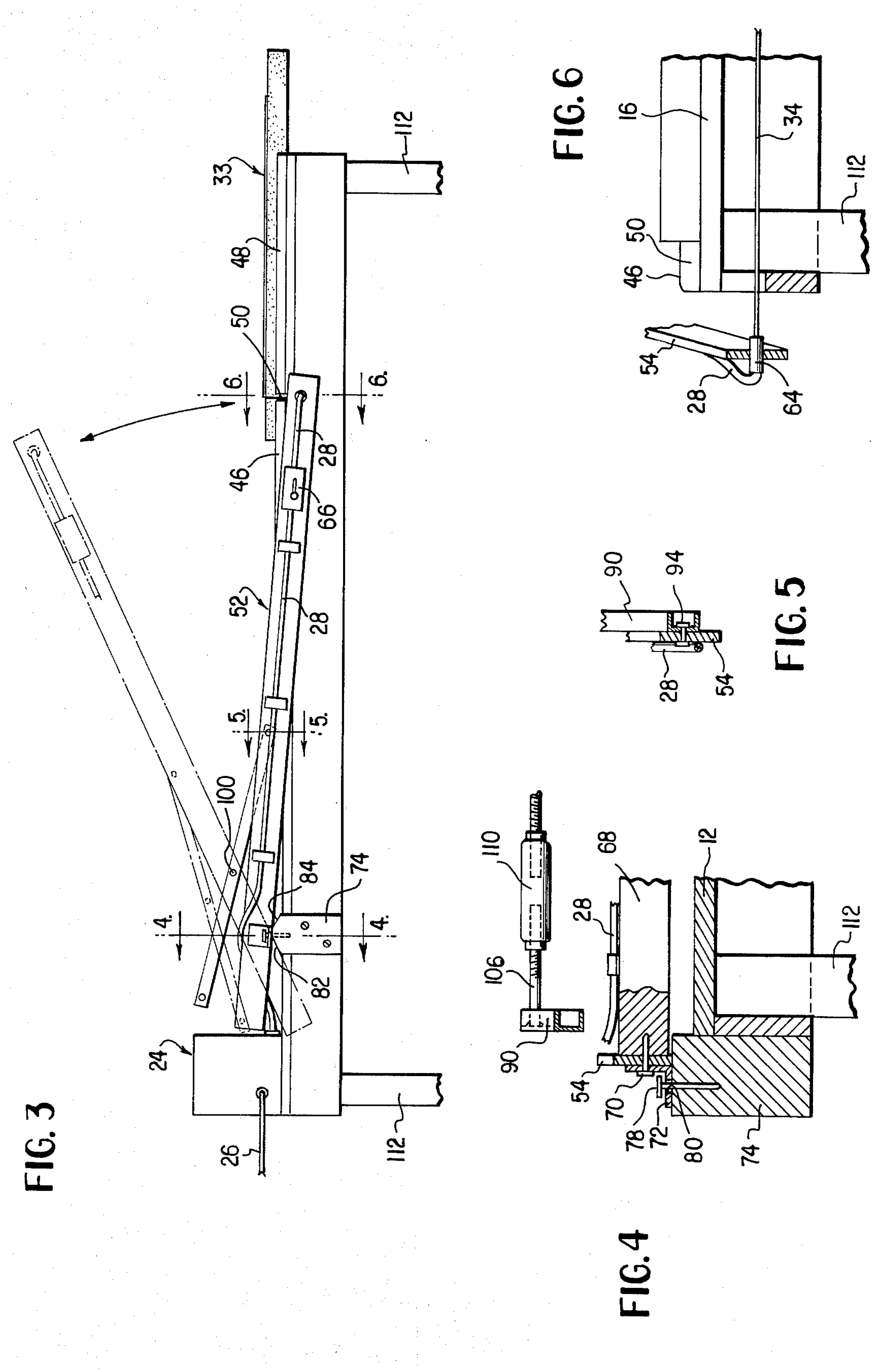
FIG. 3 is a side elevational view of the assembly shown in FIG. 1.
FIG. 4 is an enlarged vertical section taken substantially along the plane of section 4—4 in FIG. 3.
FIG. 5 is an enlarged detail section as indicated by the section 5—5 in Figure.
FIG. 6 is an enlarged detail section taken substantially along the plane of section 6—6 in FIG. 3.

The ends of the arms 54 and 56 which are remote from the free ends 58 and 60 thereof are interconnected by the transverse member 68 which serves as a support for the lines 28 and 30 as shown and which may be connected to the arms by suitable fastening elements such as that illustrated at 70 in FIG. 4. The fastening element 70 also secures a pivot mounting angle member 72 to each of the respective arms 54 and 56 and the side posts 74 and 76 are secured to the opposite side edges of the table as illustrated in FIGS. 3 and 4 and receive suitable fasteners 78 which may project through oversize openings 80 in the respective elements 72 to allow vertical swinging motions of the frame as is illustrated in full and dashed lines in FIG. 3.

The upper ends of the side posts 74 and 76 may be beveled as is indicated at 82,84 to facilitate the requisite rocking motion of the frame 52. The pivotal connections at 70 define a transverse pivot axis therefor which is parallel to the groove or channel 16 and which is located just above the supporting surface 12. The oversize openings 80 not only allow slight positioning of the wire 34 in order to assure precise registry thereof with the edges of the laminate 33, but also permit the operator to guide the wire 34 downwardly in a vertical plane such that despite the arcuate path which would be followed by the wire 34 if a fixed pivot axis were used in cutting through the foam material, there will be no perceptible concavity or convexity to the edge which is actually formed in the foam material 32.

Associated with the arms 54 and 56 is a tensioning frame indicated generally by the reference character 86 and which will be seen to include the two struts 88 and 90 which are fixed at their forward ends by means of suitable fasteners 92 and 94 to intermediate sections of the arms 54 and 56. The struts 88 and 90 extend rearwardly towards the end 22 of the table and intermediate their ends they are spaced apart by the bridging member 98 which may be provided with pins 100, see FIG. 3, at its opposite end received in suitable openings in the arms or struts 88 and 90 allowing them to pivot relative to the bridge piece 98. The rearward ends of the struts 88 and 90 are interconnected by a tensioning device indicated generally by the reference character 100 and which may take the form simply of a first rod 102 secured at one end to the strut 88 and having a threaded opposite end 104, and a second rod 106 secured at one end to the strut 90 and having a threaded end 108. These threaded ends are joined by means of a turnbuckle 110 which is adjusted to draw the ends of the struts 88 and 90 together as fulcrumed about the bridging piece 98, thereby to urge the remote ends of the struts 88 and 90 apart and thereby spread the arms 54 and 56 to maintain a predetermined and constant tension on the wire 34 thereby to prevent its sagging or slackening incidental to heating of the wire.

The table is of course provided with suitable supporting legs 112 so as to dispose the supporting surfaces 12 and 14 at a comfortable height. In operation, the operator stands to that side of the table illustrated at the bottom in FIG. 1 and manually swings the frame 52 to effect cutting action. Conveniently, the switch 66 is located adjacent the area where the operator normally will grasp the arm 54 controlling the swinging motion thereof.

The two sections 12 and 13 of the supporting surface allow a maximum of supporting surface for conveniently and accurately positioning the block 32 to achieve the requisite trimming or cutting action precisely in alignment with the side edges of the laminate 34. Not shown is a suitable fume educting fan and hood assembly which protects the operator and the environment against fumes generated during the melting of the heated wire 34 through the material 32.

With the construction as shown, the operator may quickly and accurately trim the block 32 to the precise dimensions delineated by the finished laminate 33 and the resultant product may conveniently be finished by painting the trimmed edges of the block material 32 to provide an esthetic appearance. The finished product of course can be mounted in any desired fashion against a suitable vertical supporting surface or the like, as desired and necessary.

The conventional technique of cutting the foamed material to size and then adhering the art work to one face thereof inevitably leads to an article in which the circumscribing edges of the art work and of the foamed material are not accurately registered. This results either in portions of the foamed material projecting beyond the art work or portions of the art work projecting beyond the foamed material, or both. Not only is the article thereby rendered less aesthetic, but delamination between the art work and foamed material is a distinct possibility. In the present invention, however, the trimming of the foamed material to the dimensions of the art work, after the latter has been adhesively secured to an oversize piece of the foamed material, allows a far superior finished product to be made. A foamed material which is very dense may be used which, in turn, permits superior adhesives to be employed. In this regard, the previous techniques of sawing the foamed material to size were restricted to the use of less dense foamed material which, by virtue of its rather rough and porous surfaces, did not permit the most effective adhesives to be used and, moreover, offered less surface area for whatever adhesive was employed. The dense foams which are employed in this invention have a smooth, rather than a textured surface, and thus allow excellent bonding to be achieved. Further, the vertically descending wire may be very accurately aligned with the edges of the art work and in cutting through the foamed material achieves a very smooth transition between the edge of the art work and the resultant very smooth edge of the foamed material. The thus exposed side edges of the foam will readily accept decorative paint or the like, again a feature not practical with less dense foamed material.

What is claimed is:

1. Apparatus for sizing a block of foamed synthetic resinous material having a laminate adhered thereto, which comprises in combination:

a table providing a horizontal supporting surface and having a transverse groove disposed between opposite ends of such surface;

a pair of arms, one disposed along each of the opposite side edges of said supporting surface and means pivotally connecting one end of each arm to said table whereby the free ends of said arms are free to move in a vertical plane;

an electrical resistance wire extending between said free ends of the arms and positioned to pass into said groove as the free ends of said arms are moved downwardly;

means for selectively connecting said wire to a low voltage current supply whereby to heat the wire to a temperature sufficient to melt through said foamed material; and means for automatically maintaining said wire under predetermined tension to prevent sagging thereof when heated to operating temperature.

2. Apparatus as defined in claim 1 wherein the means last mentioned comprises a spreader frame carried by said arms between the ends thereof.

3. Apparatus as defined in claim 2 wherein said spreader frame comprises a pair of rigid struts and a bridging member extending therebetween to define an H-shaped structure, corresponding ends of said struts being secured to the respective arms, and mechanism urging the opposite ends of said struts toward each other whereby to urge the free ends of said arms apart to tension said wire therebetween.

4. Apparatus as defined in claim 3 wherein said table includes an upstanding guide member along one side edge thereof and having a gap therein in registry with said groove.

5. Apparatus as defined in claim 2 wherein said table includes an upstanding guide member along one side edge thereof and having a gap therein in registry with said groove.

6. Apparatus as defined in claim 1 wherein said table includes an upstanding guide member along one side edge thereof and having a gap therein in registry with said groove.

7. Apparatus as defined in claim 1 wherein the means pivotally connecting the arms to the table allows a predetermined displacement of the pivot axis defined thereby such that an operator may guide said wire in a vertical plane while cutting through the foamed material.

8. Apparatus for sizing a block of foamed plastic material to the dimensions of a laminate adhered thereto, which comprises the combination of:

a table providing a horizontal supporting surface and having an upstanding guide member extending along one side edge thereof;

a pair of arms disposed outboard of the respective side edges of said table and means pivotally connecting each arm adjacent one end thereof to said table whereby said arms are swingable on vertical planes;

an electrical resistance wire carried between the free ends of said arms and tensioned therebetween and means for electrically energizing said wire to heat same;

said guide member and table providing a transverse channel for allowing said wire to pass thereinto and thus cut through the foamed plastic material along a line registered with such channel; and means for urging the free ends of said arms apart whereby constantly to maintain said wire under tension, said means pivotally connecting said arms to said table defining a pivot axis therefor which extends parallel to said channel and slightly above said supporting surface.

9. Apparatus for sizing a block of foamed plastic material to the dimensions of a laminate adhered thereto, which comprises the combination of:

a table providing a horizontal supporting surface and having an upstanding guide member extending along one side edge thereof;

a pair of arms disposed outboard of the respective side edges of said table and means pivotally connecting each arm adjacent one end thereof to said table whereby said arms are swingable in vertical planes;

an electrical resistance wire carried between the free ends of said arms and tensioned therebetween and means for electrically energizing said wire to heat same;

said guide member and table providing a transverse channel for allowing said wire to pass thereinto and thus cut through the foamed plastic material along a line registered with such channel; and means for urging the free ends of said arms apart whereby constantly to maintain said wire under tension, said means pivotally connecting said arms to said table defining a pivot axis therefor which extends parallel to said channel and slightly above said supporting surface, said channel dividing said supporting surface and said guide member into two sections, one of which is disposed between said arms and the other of which is located beyond the free ends thereof.

* * * * *